Patented Mar. 31, 1936

2,036,159

UNITED STATES PATENT OFFICE 2,036,159

MANUFACTURE OF NEW AZO DYESTUFF

Mordecai Mendoza, Blackley, Manchester, England, assignor to Imperial Chemical Industries Limited, a corporation of Great Britain No Drawing. Application January 17, 1935, Serial No. 2,301. In Great Britain January 12, 1934

6 Claims. (Cl. 8—5)

According to the present invention I manufacture new azo dyestuff of the constitution

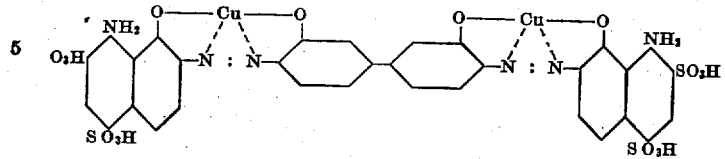

by coupling tetrazotized 3:3'-dimethoxy-4:4'-diaminodiphenyl with 2 molecular proportions of 1:8-aminonaphthol-2:4-disulphonic acid in alkaline medium and then treating with a hot alkaline copper solution until the alkyl groups have been split off.

Also according to the invention I apply the new dyestuff having the said constitution to cellulose materials by methods for direct dyestuffs.

In this way I obtain greenish-blue shades on cellulosic materials, which have very good fastness to light and to soap. Such a result has not previously been obtainable by means of direct dyeing dyestuffs.

Although it is known to obtain direct azo dyestuffs from tetrazotized-p-p'-diaminodiphenyls by coupling in alkaline solution with hydroxy compounds adapted to couple in ortho position to give deystuffs which are improved in fastness to light when after-coppered on the fibre and although it is known to prepare copper-containing dyestuffs in substance by coupling tetrazotized dianisidine and tetrazotized 3:3'-diethoxy benzidine with naphthol or aminonaphtholsulphonic acids by treating with a hot dilute acid solution of copper sulphate (cf. British Patent No. 113,141) and by treating with ammoniacal copper sulphate (cf. British Patent No. 395,027) it has not been known to obtain a dyestuff giving the valuable results of this new dyestuff.

In the manufacture of the new dyestuff, I have found that complete interaction and removal of the alkyl groups only takes place in alkaline medium. I have also found that the dyestuffs obtained in the absence of complete interaction give dyeings that are defective in fastness to light and washing.

The invention is illustrated, but not limited, by the following examples in which the parts are by weight.

Example 1

90.4 parts of the dyestuff obtained by coupling the tetrazo derivative of 3:3'-dimethoxy-4:4'-diaminodiphenyl with two molecular proportions of 1:8-aminonaphthol-2:4-disulphonic acid in alkaline medium are dissolved in 2000 parts of hot water. There is then stirred in a mixture of 60 parts of aqueous ammonia (sp. gr. .880) with 50 parts of crystalline copper sulphate dissolved in 200 parts of water. The whole is stirred and boiled under a reflux condenser for about 20 hours, i. e. until methylamine ceases to be evolved.

At the end of this period, the resulting suspension is cooled to room temperature, the alkalinity is diminished by adding about 30 parts of 36% hydrochloric acid, and 300 parts of common salt are stirred in.

The new copper complex is then filtered off, dried and ground. It is readily soluble in water giving a greenish-blue solution and when dyed on cotton from an alkaline bath by the usual direct dyeing process it yields green-blue shades of very good fastness to light.

Analysis shows that there is one atomic proportion of copper to each three atoms of nitrogen, i. e. there is one atom of copper to each azo group. The new copper derivative is unchanged even after prolonged boiling with dilute aqueous alkali.

Example 2

100 parts of cotton cloth are wetted out and immersed in the dyebath containing 1 part of the new dyestuff of Example 1 in 2000 parts of water. The temperature is raised to 95° C. and kept at this for ¾ hour, while 30 parts of sodium sulphate are added to assist exhaustion. After this the cloth is removed from the dyebath, rinsed and dried. It is dyed a level greenish-blue shade of very good fastness to light.

Example 3

A printing paste is made up as follows:—

| | Parts |
|---|---|
| New dyestuff | 0.8 |
| Water | 27.2 |
| Glycerine | 5 |
| Gum tragacanth thickening 8% | 65 |
| Sodium phosphate | 2 |
| | 100 |

This paste is printed on cotton, the cloth is dried, steamed for 1 hour in moist steam at 100° C. and rinsed in water to remove the thickening. A greenish-blue shade of very food fastness to light is formed.

I claim:

1. Process for the manufacture of a new copper-containing azo dyestuff of the constitution

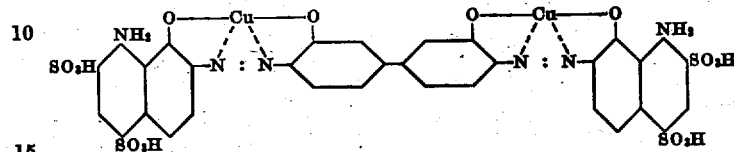

which comprises treating with a hot alkaline copper solution until the alkyl groups have been split off, the azo dyestuff made by coupling tetrazotized 3:3'-dimethoxy-4:4'-diaminodiphenyl with 2 molecular proportions of 1:8-aminonaphthol-2:4-disulphonic acid in alkaline medium.

2. The azo dyestuff represented by the formula

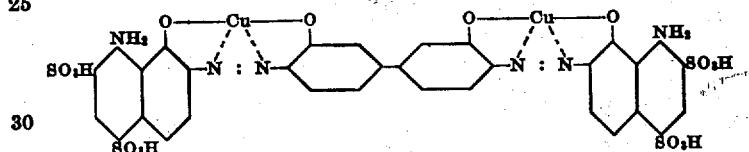

3. The process which comprises coupling in alkaline medium tetrazotized 3:3'-dimethoxy-4:4'-diaminodiphenyl with two molecular proportions of 1:8-aminonaphthol-2:4-disulphonic acid, dissolving 90.4 parts of the product in water, admixing 60 parts aqueous ammonia of specific gravity .880 and 50 parts copper sulfate in 200 parts of water, boiling under reflux for about 20 hours with stirring, cooling to room temperature, adding about 30 parts of 36% hydrochloric acid and 300 parts of salt and filtering and drying the copper containing dye.

4. The process which comprises dissolving in water the product of coupling in alkaline medium tetrazotized 3:3'-dimethoxy-4:4'-diaminodiphenyl with two molecular proportions of 1:8-amino-naphthol-2:4'-disulphonic acid, admixing ammonia and aqueous copper sulfate, refluxing until methylamine no longer evolves, cooling, adding hydrochloric acid and salt, and segregating the dye.

5. The process which comprises dissolving in aqueous basic medium the product of coupling in alkaline medium tetrazotized 3:3'-dimethoxy-4:4'-diaminodiphenyl with two molecular proportions of 1:8-aminonaphthol-2:4-disulphonic acid, admixing aqueous copper sulfate, refluxing until interaction is complete, and segregating the dye.

6. The process which comprises treating with a hot copper sulfate solution until the alkaline groups have been split off, the azo dyestuff resulting from the coupling in alkaline medium of tetrazotized 3:3'-dimethoxy-4:4'-diaminodiphenyl and two molecular proportions of 1:8-aminonaphthol-2:4-disulphonic acid.

MORDECAI MENDOZA.

CERTIFICATE OF CORRECTION.

Patent No. 2,036,159.   March 31, 1936.

MORDECAI MENDOZA.

It is hereby certified that error appears in the printed specification of the above numbered patent requiring correction as follows: Page 2, second column, line 7, claim 4, for "2:4'" read 2:4; and that the said Letters Patent should be read with this correction therein that the same may conform to the record of the case in the Patent Office.

Signed and sealed this 30th day of June, A. D. 1936.

(Seal)

Henry Van Arsdale
Acting Commissioner of Patents.

This paste is printed on cotton, the cloth is dried, steamed for 1 hour in moist steam at 100° C. and rinsed in water to remove the thickening. A greenish-blue shade of very food fastness to light is formed.

I claim:

1. Process for the manufacture of a new copper-containing azo dyestuff of the constitution

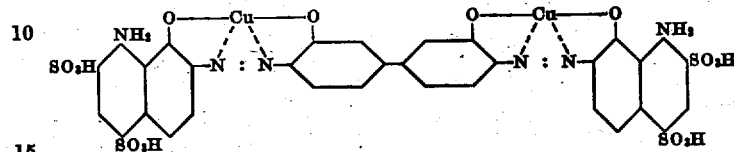

which comprises treating with a hot alkaline copper solution until the alkyl groups have been split off, the azo dyestuff made by coupling tetrazotized 3:3'-dimethoxy-4:4'-diaminodiphenyl with 2 molecular proportions of 1:8-aminonaphthol-2:4-disulphonic acid in alkaline medium.

2. The azo dyestuff represented by the formula

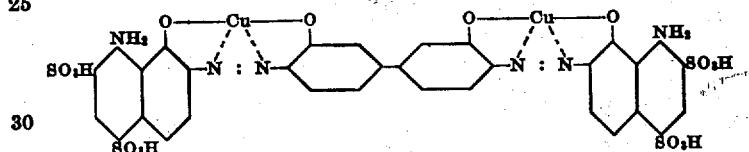

3. The process which comprises coupling in alkaline medium tetrazotized 3:3'-dimethoxy-4:4'-diaminodiphenyl with two molecular proportions of 1:8-aminonaphthol-2:4-disulphonic acid, dissolving 90.4 parts of the product in water, admixing 60 parts aqueous ammonia of specific gravity .880 and 50 parts copper sulfate in 200 parts of water, boiling under reflux for about 20 hours with stirring, cooling to room temperature, adding about 30 parts of 36% hydrochloric acid and 300 parts of salt and filtering and drying the copper containing dye.

4. The process which comprises dissolving in water the product of coupling in alkaline medium tetrazotized 3:3'-dimethoxy-4:4'-diaminodi-phenyl with two molecular proportions of 1:8-amino-naphthol-2:4'-disulphonic acid, admixing ammonia and aqueous copper sulfate, refluxing until methylamine no longer evolves, cooling, adding hydrochloric acid and salt, and segregating the dye.

5. The process which comprises dissolving in aqueous basic medium the product of coupling in alkaline medium tetrazotized 3:3'-dimethoxy-4:4'-diaminodiphenyl with two molecular proportions of 1:8-aminonaphthol-2:4-disulphonic acid, admixing aqueous copper sulfate, refluxing until interaction is complete, and segregating the dye.

6. The process which comprises treating with a hot copper sulfate solution until the alkaline groups have been split off, the azo dyestuff resulting from the coupling in alkaline medium of tetrazotized 3:3'-dimethoxy-4:4'-diaminodi-phenyl and two molecular proportions of 1:8-aminonaphthol-2:4-disulphonic acid.

MORDECAI MENDOZA.

CERTIFICATE OF CORRECTION.

Patent No. 2,036,159. March 31, 1936.

MORDECAI MENDOZA.

It is hereby certified that error appears in the printed specification of the above numbered patent requiring correction as follows: Page 2, second column, line 7, claim 4, for "2:4'" read 2:4; and that the said Letters Patent should be read with this correction therein that the same may conform to the record of the case in the Patent Office.

Signed and sealed this 30th day of June, A. D. 1936.

(Seal)

Henry Van Arsdale
Acting Commissioner of Patents.

CERTIFICATE OF CORRECTION.

Patent No. 2,036,159.　　　　　　　　　　　　　　　　March 31, 1936.

MORDECAI MENDOZA.

It is hereby certified that error appears in the printed specification of the above numbered patent requiring correction as follows: Page 2, second column, line 7, claim 4, for "2:4'" read 2:4; and that the said Letters Patent should be read with this correction therein that the same may conform to the record of the case in the Patent Office.

Signed and sealed this 30th day of June, A. D. 1936.

(Seal)　　　　　　　　　　　　　　　　　　　　Henry Van Arsdale
　　　　　　　　　　　　　　　　　　　　Acting Commissioner of Patents.